United States Patent

[11] 3,601,853

| | | | | | | |
|---|---|---|---|---|---|---|
| [72] | Inventor | Anton Johannes Vox<br>Ruit, Germany | [56] | | References Cited | |
| [21] | Appl. No. | 804,224 | | | UNITED STATES PATENTS | |
| [22] | Filed | Mar. 4, 1969 | 1,341,670 | 6/1920 | Powell | 18/26 RR |
| [45] | Patented | Aug. 31, 1971 | 3,555,615 | 1/1971 | Orme | 18/26 RR |
| [73] | Assignee | Thermovox GmbH, Kunststoffmaschinen<br>Ruit, Germany | 810,193 | 1/1906 | Daum | 18/26 M |
| [32] | Priority | Mar. 5, 1968 | 3,054,141 | 9/1962 | Hammesfahr | 18/4 P |
| [33] | | Germany | | | | |
| [31] | | P 17 04 384.4 | | | | |

*Primary Examiner*—J. Spencer Overholser
*Assistant Examiner*—Norman E. Lehrer
*Attorney*—Karl F. Ross

[54] ROTARY-CASTING MACHINE
9 Claims, 3 Drawing Figs.

[52] U.S. Cl. .................................................. 18/26 RR,
18/5 RR, 18/20 R
[51] Int. Cl. .................................................. B29c 5/04
[50] Field of Search ........................................ 18/26 R, 26
M, 20 R, 4 P, 5 RR, 26 RR; 164/325, 326, 289,
290, 294

ABSTRACT: A rotary-casting machine, especially for the casting of hollow bodies of a thermoplastic synthetic resin, which has a drum with a horizontal axis and a number of axially extending cylindrical sectors each constituting a row of centrifugal-casting molds. The housing surrounds the drum along at least two of the sectors to define a heating and a cooling chamber therealong, the chambers being separated by a radially extending thermally insulating wall. The individual forms are spun about two mutually perpendicular axes including at least one axis perpendicular to the axis of rotation of the drum.

INVENTOR.
ANTON J. VOX
BY
Karl F. Ross
ATTORNEY

ROTARY-CASTING MACHINE

My present invention relates to rotary casting machines and, more particularly, to apparatus for the casting of synthetic-resin (thermoplastic) materials by rotary casting techniques.

In the rotary casting of a flowable but hardenable material, a mold or form receives the flowable material and is spun about at least one axis to distribute the material substantially uniformly along the inner wall of the mold, thereby producing, by hardening or setting of the material, a hollow body which is usually axially symmetrical and has a substantially constant wall thickness. In the rotary mold casting of thermoplastic synthetic-resin materials, the casting substance is rendered flowable at least in part by heat applied to the material through the mold wall, the heat sufficing to bring the synthetic resin to its flow temperature.

In earlier rotary or centrifugal casting machines for the production of hollow bodies, e.g. containers, from thermoplastic synthetic resin, the bodies being open at one or another end and/or being substantially closed, it has been the practice to introduce the synthetic-resin material into a casting mold in the form of synthetic-resin granules, powder or preplasticized paste and to heat the synthetic-resin material in the mold and by uniform and relatively slow rotation or spin of the latter, coat the walls of the mold with the plastic material in a flowable state. Upon subsequent coating, a uniform-thickness hollow body is thus produced. After cooling, rotation of the mold is terminated and the body removed either by opening the mold in place or by bodily removing the mold from the assembly and replacing it with a mold into which a further portion of thermally flowable synthetic resin has been charged.

Such arrangements have generally been based upon either of two operating principles. In the first of these, the mold is carried by an arm into and through an oven in which it is heated from without by a heating medium or fluid, the mold being rotated in the oven. Upon coating of the interior wall of the mold with the flowable synthetic resin, the mold is removed from the oven by the arm and, during a further period of rotation, is cooled in a cooling space into which the mold is carried on this arm. Such apparatus is relatively slow, expensive and time-consuming. Moreover, the system requires considerable space.

In the second basic arrangement, a double-walled mold is used and the heating and cooling medium is introduced between the walls of the mold and may even constitute the power medium by which the mold is rotated. In this case, the flowable material is heated and cooled by conduction through the wall of the mold. The rotating devices in such systems must be relatively massive and strong and again are comparatively expensive although a more rapid system is obtained and less space is necessary.

It is the principal object of the present invention to provide a rotary-mold casting system for making hollow bodies from a thermally flowable material, e.g. a thermoplastic in which the disadvantages of the earlier systems mentioned above are eliminated and a rapidly operating, relatively inexpensive and efficient production of the hollow bodies can be achieved with equipment requiring relatively little space.

Another object of this invention is to provide an improved apparatus for the rotary-mold casting of synthetic resins which combines the positive attributes of both of the hitherto used systems described above.

These objects, and others which will become apparent hereinafter, are attained in accordance with the present invention in an apparatus for the rotary casting of thermally flowable synthetic-resin material which makes use of a drum-type mold carrier which is rotatable about a horizontal axis and has the molds angularly spaced and circumferentially distributed therearound. The drum carrier of the present invention cooperates with a housing subtending part of the periphery of the mold carrier and defining along the path of the latter, in the direction of rotation thereof, a heating chamber in which the thermoplastic material is brought to its flow temperature, and a cooling chamber in which the temperature is reduced to set the thermoplastic. In the chambers the individual molds are rotated about at least one axis by a drive means which is advantageously independent of the drive means rotating the mold carrier. The latter is intermittently, preferably periodically, rotated or stepped to advance successive sectors of the mold carrier through the successive chambers to finally carry the molds out of the housing into a region in which the cast bodies can be removed either while leaving the molds in place or by withdrawing the molds and replacing them with molds freshly charged with the synthetic-resin material.

According to a more specific feature of this invention, the heating chamber subtends one or more of these sectors while the cooling chamber subtends a sector and the periodic drive is progressed to step the mold carrier angularly about its horizontal axis through a stroke of one sector. The interior of the heating chamber may be subdivided by a partition which, like the partition between the heating and cooling chambers, is thermally insulating, so that a plurality of heating compartments, each extending over the full circumferential extent of a sector, are formed. The sectors are also advantageously subdivided on the mold carrier by radially and, preferably, diametrically extending partitions of thermal insulation. When four such sectors are provided along the drum, these internal partitions are respectively aligned with the generally radial external partitions of the housing means when the carrier is immobilized after each cycle of angular advance.

Still another feature of this invention resides in the provision of a mold-support frame on the carrier along each of the sectors, these frames each having a plurality of axially spaced molds which are rotatably mounted so as to spin about respective mold axes perpendicular to the horizontal axis of rotation of the drum. The frames themselves may be rotatable about respective horizontal axes parallel to the axis of rotation of the drum and thereby permitting the molds to rotate about two mutually perpendicular axes independently of the drive for the drum.

A rotary-mold casting machine of this type has proved to be much simpler and of greater structural integrity than earlier arrangements, to make use of relatively simple and inexpensive molds, to allow the high-rate production of cast bodies, and to facilitate removal of the bodies from the mold carrier. In fact, an apparatus of this character can be operated substantially continuously for serial production of the thermoplastic bodies.

The above and other objects, features and advantages of the present invention will become more readily apparent from the following description, reference being made to the accompanying drawing in which.

Figure 2:
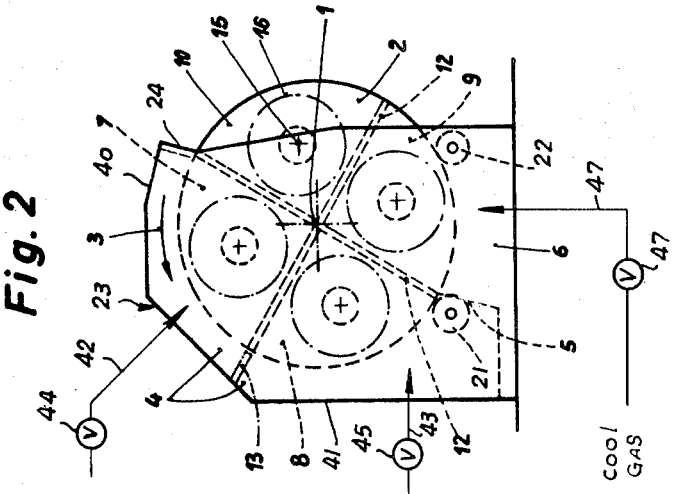
FIG. 2 is a side view thereof.

In the drawing, I have shown an apparatus for the centrifugal casting of a multiplicity of synthetic resin objects, represented by balls, in a periodic by substantially uninterrupted (continuous) sequence.

The apparatus comprises a support 20 defining a horizontal axis of rotation for a drumlike rotary frame or mold carrier which is represented generally at 2 and can be supported by a number of gear wheels as shown at 21 and 22 in FIG. 2. The drum 2 is partly enclosed by a housing or hood 23 open toward the front at 24 and defining, in the direction of rotation of the drum (arrow 3 in FIG. 2) a heating chamber 4 and a cooling chamber 6. These chambers are separated by an insulating wall 5 which subdivides the housing.

Figure 1:
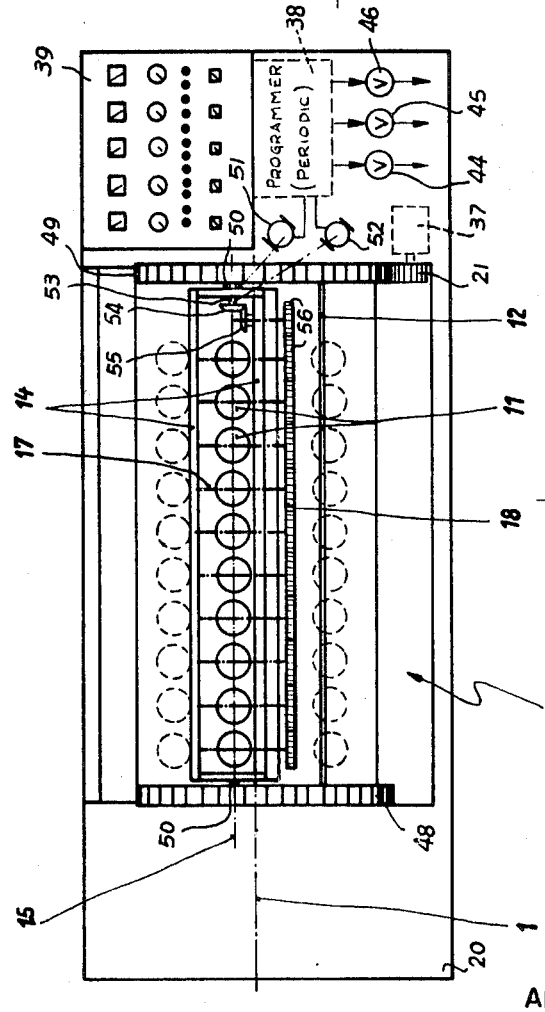
FIG. 1 is an elevational view of a rotary-mold centrifugal casting machine according to the present invention.

In the embodiment illustrated in FIGS. 1 and 2, the drum or mold carrier 2 is subdivided into four segments having the configuration of four circumferential sectors 7, 8, 9 and 10, each of which has a pair of members 14 defining a support frame.

Figure 3:
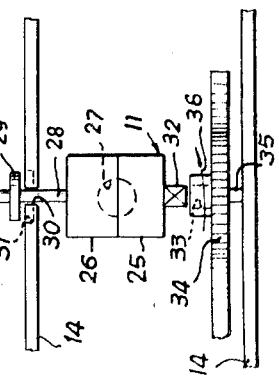
FIG. 3 is a detail view of a mold adapted to be used in the machine.

The frames 14 each carrying a row of ten molds 11 which have been shown diagrammatically in FIGS. 1 and 2 and are separated from one another by radially extending insulating walls 12 (FIG. 2) having the configuration of a star and closing at the horizontal axis of rotation 1 of the drum. The molds 11 (see FIG. 3) may be separable in a conventional manner and may have mold halves 25 and 26 which fit together to define the mold cavity 27. When the molds 11 are mounted in the support frame 14, they have previously been opened to discharge the previous form and have been charged with a supply of thermoplastic material. The molds 11 may be mounted on shafts 28 carrying a bearing 29 which, when the shaft 28 is inserted in a recess 30 of the leading frame member 14, can seat in the recess 31 provided in this frame member. When the bearing 29 drops in the recess 31, a prismatic stub 32 of the mold fits into a correspondingly shaped socket 33 of a drive gear 34 whose shaft 35 is rotatable on the other frame member. Hence the molds 11 can be rapidly removed and replaced on the respective frames and can be spun about respective axes 17 as represented by the arrow 36.

The drive gear 21 is provided with a motor 37 which is periodically driven by a programmer 38 (i.e. a timer provided with cams or the like) the sequence of which may be controlled at a panel 39 on the face of the machine. The system 37, 38, 21 thus constitutes a periodic drive for the drum 2 adapted to advance the drum 2 angularly, segment by segment into the housing and position the molds therein for a period sufficient to allow the heating fluid in the chamber 4 to render the thermoplastic material liquid or flowable and the rotary motion of the mold to deposit the flowable material on the mold walls, and also sufficient to cool the molds in the cooling chamber to set the thermoplastic.

The angular stroke of the drum 2 is established such that, in each working cycle, one of the insulating walls 12 subdividing the drum into the four sectors is positioned opposite the partition 5 between the heating chamber 4 and the cooling chamber 6, while another wall 12 is juxtaposed opposite an optional thermally insulating partition 13 which is also generally radial and subdivides the chamber 4 into a pair of heating compartments 40 and 41 each extending over a segment of the drum.

The compartments 40 and 41 are supplied with heating fluid as represented at 42 and 43 via valves 44 and 45 controlled by the programmer 38 and adapted to introduce a warm gas into the forwardly heating compartment and a hotter gas into the heating compartment therebehind, the compartments being maintained at, for example, 220° C and 280° C, respectively. Into chamber 6, a valve 46 introduces a cooling fluid via line 47 as represented at FIG. 2. In the position of the system shown in the Figure, the sectors 7 and 8 are disposed in the heating compartments 40 and 41 while the sector 9 is located in the cooling chamber, and sector 10 is exposed through the open side of the housing to allow the molds or the molded products to be removed.

As is apparent from FIGS. 1 and 2, the frames 14 are mounted in the support disks 48 and 49 of the drum via shafts 50 so as to be rotatable about respective horizontal axes 15 parallel to the axis of rotation 1 of the mold carrier. Shafts 50 are driven by the programmer 38 via a motor 51 associated with each of the frames 14 while another motor 52 drives a coaxial shaft 53 of each frame carrying a bevel gear 54. The bevel gear 54 meshes, inturn, with a gear 55 of the frame designed to orbit the sun gear 54 and drive a gear train 56 made up of the gears 34 which spin the molds 11 about their respective axes 17. Consequently, the molds 11 may be spun slowly independently of the rotation of the drum 2 about two mutually perpendicular axes, namely, the horizontal axis 15 of each frame 14 and the axis 17 individual to each mold. Programmer 38 maintains the spinning of the molds in the stationary condition of the drum 2, i.e. after the molds have been positioned in the respective chambers.

The improvement described and illustrated is believed to admit of many modifications within the ability of persons skilled in the art, all such modifications being considered within the spirit and scope of the invention except as limited by the appended claims.

1. An apparatus for the rotary casting of thermoplastic material, comprising:
    a support;
    a mold carrier rotatable about a substantially horizontal axis and having the configuration an axially elongated generally cylindrical drum subdivided angularly into a plurality of segments;
    a plurality of molds mounted on each of the segments of said carrier and angularly spaced around said horizontal axis;
    housing means on said support subtending a portion of the periphery of said carrier, said housing means including means subdividing same into a heating chamber and a cooling chamber successively traversed by said molds in groups according to the respective segments upon rotation of said carrier;
    first drive means for rotating said carrier to displace said molds successively through said chambers for alternately heating and cooling each mold to render thermoplastic materials therein initially flowable and for thereafter setting the flowable material;
    second drive means for rotating said molds about respective axes perpendicular to said horizontal axis of rotation of said drum at least while said molds traverse said chambers to deposit the flowable thermoplastic material uniformly on the interior walls of said molds and set said material along said walls; and
    means for introducing a heating fluid into said heating chamber and a cooling fluid into said cooling chamber.

2. An apparatus for the rotary casting of thermoplastic material, comprising:
    a support;
    a mold carrier rotatable about a substantially horizontal axis;
    a plurality of molds mounted on said carrier and angularly spaced therearound;
    housing means on said support subtending a portion of the periphery of said carrier, said housing means including means subdividing same into a heating chamber and a cooling chamber successively traversed by said molds upon rotation of said carrier;
    first drive means for rotating said carrier to displace said molds successively through said chambers for alternately heating and cooling each mold to render thermoplastic materials therein initially flowable and for thereafter setting the flowable material;
    second drive means for rotating said molds about respective axes transverse to paid horizontal axis at least while said molds traverse said chambers to deposit the flowable thermoplastic material uniformly on the interior walls of said molds and set said material along said walls, said mold carrier having the configuration of an axially elongated generally cylindrical drum and being subdivided angularly into a plurality of segments each having a multiplicity of longitudinally spaced molds with the molds of each segment constituting a group processed in the respective chambers simultaneously, said housing means extending along said drum and being provided with means for introducing a heating fluid into said heating chamber and a cooling fluid into said cooling chamber; and
    means for periodically advancing said drum to step said segments successively through said heating chamber and said cooling chamber.

3. The apparatus defined in claim 2 wherein the means for subdividing said heating means into said heating chamber and said cooling chamber includes a thermally insulated partition extending generally radially with respect to said axis of rotation of said mold carrier.

4. The apparatus defined in claim 2, further comprising at least one thermally insulated radial partition subdividing said heating chamber into a pair of heating compartments operable at different temperatures, each of said compartments extending over a segment of said drum.

5. The apparatus defined in claim 2 wherein said mold carrier is subdivided into four segments, each having at least one row of molds, said heating chamber enclosing two of said segments and said cooling chamber extending over one of said segments.

6. The apparatus defined in claim 5 wherein said second drive means includes a shaft carrying each of the molds of each row along the axis of said carrier, gear means coupling the shafts of molds of each row together for joint rotation, and means for driving gear means.

7. The apparatus defined in claim 6 wherein each of said segments comprises a respective frame carrying the molds of the corresponding row, and means for rotating each frame and the molds carried thereby about respective horizontal axes parallel to the axis of rotation of said carrier.

8. The apparatus defined in claim 7, further comprising partitions in said housing means separating said chambers from one another and subdividing said heating chamber into at least two compartments each extending over one of said segments, said partitions lying generally radially with respect to said axis of said carrier.

9. The apparatus defined in claim 8, further comprising means for introducing a relative hot-heating fluid into one of said compartments, a less hot-heating fluid into the other of said compartments, and a cooling fluid into said cooling chamber, said drum being subdivided into said segments by radial thermally insulating partitions.